(12) United States Patent
Zhou et al.

(10) Patent No.: US 8,670,086 B2
(45) Date of Patent: Mar. 11, 2014

(54) MULTIFUNCTIONAL PLASTIC FRAME AND BACKLIGHT MODULE

(75) Inventors: Gege Zhou, Shenzhen (CN); Yu-chun Hsiao, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 76 days.

(21) Appl. No.: 13/377,536

(22) PCT Filed: Nov. 23, 2011

(86) PCT No.: PCT/CN2011/082719
§ 371 (c)(1),
(2), (4) Date: Dec. 9, 2011

(87) PCT Pub. No.: WO2013/075299
PCT Pub. Date: May 30, 2013

(65) Prior Publication Data
US 2013/0128180 A1 May 23, 2013

(51) Int. Cl.
*G02F 1/1333* (2006.01)
*F21V 7/04* (2006.01)
(52) U.S. Cl.
USPC ............................. 349/58; 362/632
(58) Field of Classification Search
USPC .................... 349/58; 362/632–634
See application file for complete search history.

(56) References Cited

U.S. PATENT DOCUMENTS

| 2004/0160547 A1* | 8/2004 | Watanabe | 349/58 |
| 2005/0105985 A1 | 5/2005 | Fritsch | |
| 2005/0264714 A1* | 12/2005 | Hwang et al. | 349/58 |
| 2006/0044489 A1* | 3/2006 | Uchizono | 349/58 |

FOREIGN PATENT DOCUMENTS

| CN | 1653377 A | 8/2005 |
| CN | 101059625 A | 10/2007 |
| CN | 101305316 A | 11/2008 |

OTHER PUBLICATIONS

International Search Report of the PCT Application No. PCT/CN2011/082719.

* cited by examiner

*Primary Examiner* — Nathanael R Briggs

(57) ABSTRACT

A multifunctional plastic frame and a backlight module are disclosed. The multifunctional plastic frame comprises a frame body for supporting an LCD panel and covers movably connected with outer edges of the frame body. The covers are turned over along the outer edges of the frame body to press against edges of the LCD panel and to be buckled to the frame body. According to the present disclosure, the number of parts and consequently the cost are reduced; and the backlight module can be assembled quickly in a convenient way, which is favorable for improving the assembling efficiency of the backlight module.

11 Claims, 4 Drawing Sheets

MULTIFUNCTIONAL PLASTIC FRAME AND BACKLIGHT MODULE

BACKGROUND

1. Technical Field

The present disclosure relates to the field of liquid crystal displaying, and more particularly, to a multifunctional plastic frame and a backlight module.

2. Description of Related Art

As the competitions in the liquid crystal display (LCD) market become more and more intense, how to improve the production efficiency and enhance the competitive edge of products must be considered by LCD manufacturers in design of their products. The backlight module is one of the key components of the LCD panel in the LCD, so improvement in structure of the backlight module is essential for improving the production efficiency and product performance of the LCD. As shown in FIG. 1, a backlight module structure of the conventional LCD product is generally comprised of a backplate, a reflective sheet, a light guide panel, an optical film, a light emitting unit, a plastic frame 41, an LCD panel 42, a front frame 43 and so on. The plastic frame 41 mainly functions to support the LCD panel 42 and press against the optical film so as to ensure the structural stability of the whole backlight and prevent entry of dusts into the module. The front frame 43 mainly functions to secure the LCD panel 42 against escape of the LCD panel 42 and to shield the non-displaying region of the LCD panel 42 and the light leakage. A primary practice adopted currently is fixing the plastic frame 41 to a back cover by means of catches or screws. Specifically, after the LCD panel 42 is placed, the front frame 43 is put on to press against the LCD panel 42 and catches or screws are used to fix the front frame 43 to the back cover. However, when this fixing approach is used, the front frame 43 and the plastic frame 41 must be fixed respectively, which leads to complex operations and a low assembling efficiency; and because a large number of parts are used, loss of some parts tends to occur in the fixing process to cause degradation of the product quality.

BRIEF SUMMARY

The primary objective of the present disclosure is to provide a multifunctional plastic frame and a backlight module that allow for convenient and quick assembling and use a small number of parts.

To achieve the aforesaid objective, the present disclosure provides a multifunctional plastic frame, which comprises a frame body for supporting an LCD panel and covers movably connected with outer edges of the frame body, wherein the covers are turned over along the outer edges of the frame body to press against edges of the LCD panel and to be buckled to the frame body;

each of the covers is formed with a catching hole, the frame body is formed with catches corresponding to the catching holes, and the catches extend into the catching holes respectively to be caught therein when the covers are buckled to the frame body.

Preferably, the frame body is formed with first grooves, and the catches are disposed at bottom portions of the first grooves respectively; and each of the covers is formed with a second protruding groove corresponding to the first groove, and the catching hole is formed at a top of the second protruding groove.

Preferably, the number of the covers is at least two, and the covers are arranged along two opposite outer edges of the frame body.

Preferably, the cover is of a rectangular block form, and each of the covers is formed with one catching hole.

Preferably, each of the covers is of a strip form, and a plurality of catching holes are formed in the covers corresponding to each of the outer edges of the frame body.

The present disclosure further provides a multifunctional plastic frame, which comprises a frame body for supporting an LCD panel and covers movably connected with outer edges of the frame body, wherein the covers are turned over along the outer edges of the frame body to press against edges of the LCD panel and to be buckled to the frame body;

each of the covers is formed with a through-hole for inserting a screw therethrough, the frame body is formed with screw holes corresponding to the through-holes, and the screws are inserted through the through-holes and threaded into the screw holes respectively when the covers are buckled to the frame body.

Preferably, the number of the covers is at least two, and the covers are arranged along two opposite outer edges of the frame body.

Preferably, the cover is of a rectangular block form, and each of the covers is formed with one through-hole for inserting a screw therethrough.

Preferably, each of the covers is of a strip form, and a plurality of through-holes for inserting screws therethrough are formed in the covers corresponding to each of the outer edges of the frame body.

The present disclosure further provides a backlight module comprising an LCD panel, wherein the backlight module further comprises a multifunctional plastic frame, which comprises a frame body for supporting an LCD panel and covers movably connected with outer edges of the frame body, and the covers are turned over along the outer edges of the frame body to press against edges of the LCD panel and to be buckled to the frame body.

According to the present disclosure, covers are additionally provided on the frame body to replace the conventional front frame, and the frame body and the covers are integrally formed through injection molding, so the number of parts and consequently the cost are reduced. Furthermore, the backlight module can be assembled quickly in a convenient way by turning over the covers and buckling the covers to the frame body, which is favorable for improving the assembling efficiency of the backlight module.

BRIEF DESCRIPTION OF THE DRAWINGS

FIG. 3b is a detailed schematic structural view of a cover when being unfolded in the multifunctional plastic frame shown in FIG. 3a;

FIG. 3c is a schematic structural view of the cover after being turned over in the multifunctional plastic frame shown in FIG. 3a.

Hereinafter, implementations, functional features and advantages of the present disclosure will be further described with reference to embodiments thereof and the attached drawings.

DETAILED DESCRIPTION

It shall be understood that, the embodiments described herein are only intended to illustrate but not to limit the present disclosure.

Figure 1:
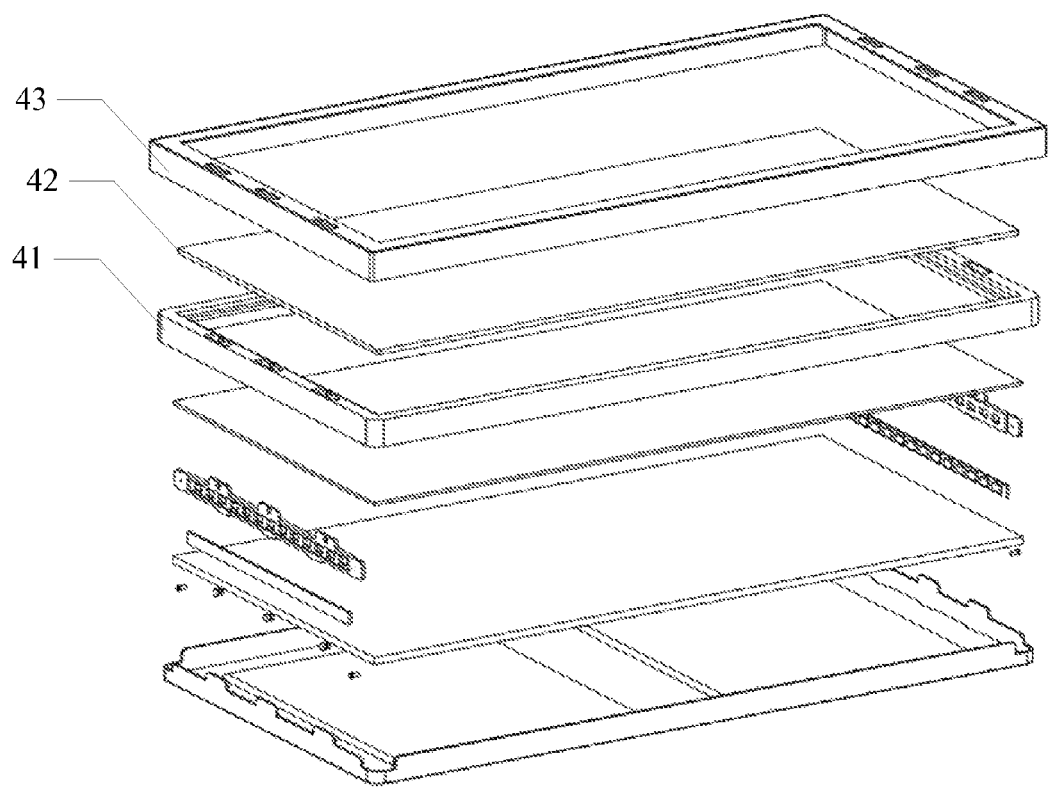
FIG. 1 is a schematic structural view of a conventional backlight module.
Figure 2:
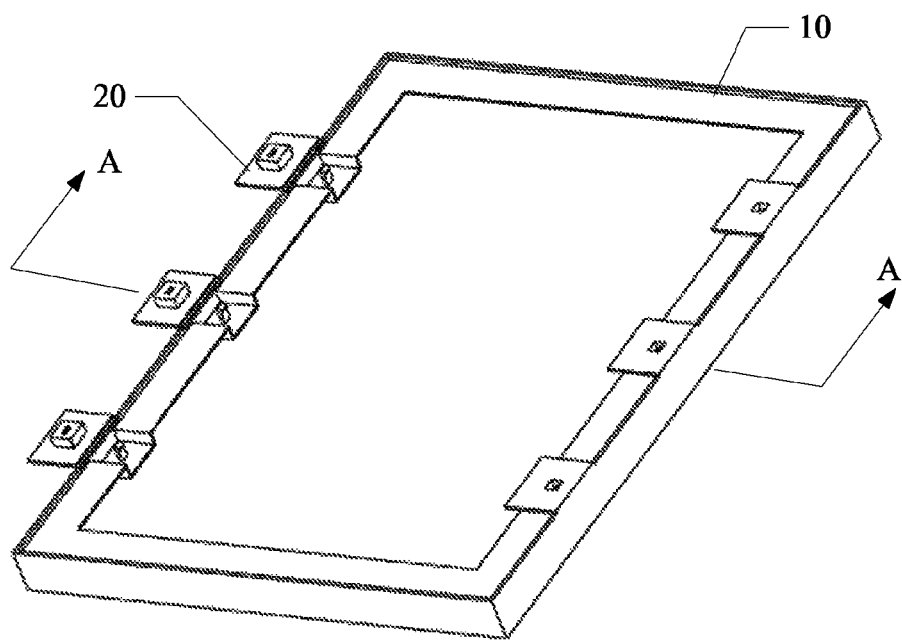
FIG. 2 is a schematic structural view of a multifunctional plastic frame according to an embodiment of the present disclosure.

As shown in FIG. 2, a schematic structural view of a multifunctional plastic frame according to an embodiment of the present disclosure is shown therein. The multifunctional plastic frame of this embodiment comprises a frame body 10 for supporting an LCD panel and covers 20 movably connected with outer edges of the frame body 10. The covers 20 are turned over along the outer edges of the frame body 10 to press against edges of the LCD panel and to be buckled to the frame body 10.

Figure 3A:
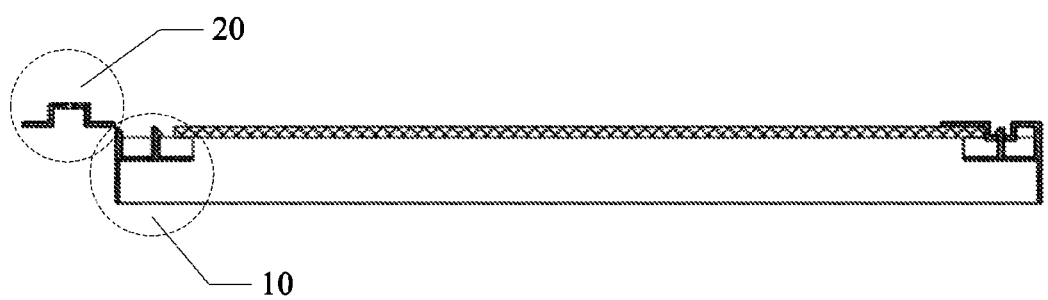
FIG. 3a is a cross-sectional view of the multifunctional plastic frame shown in FIG. 2 taken along a line A.
Figure 3B:
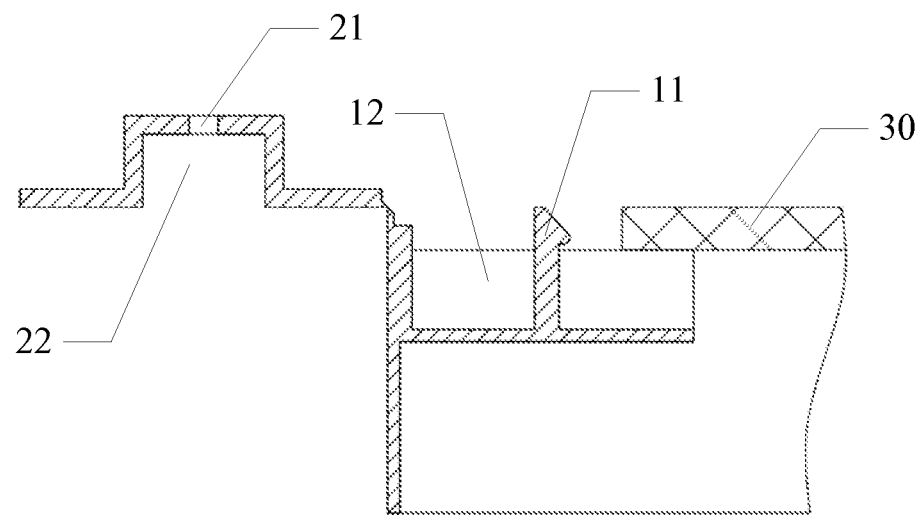
Figure 3C:
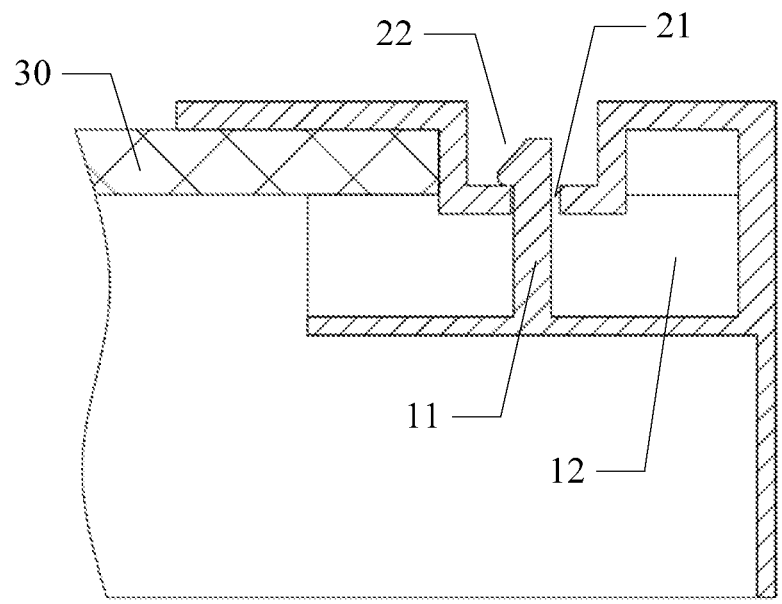

As shown in FIG. 3, FIG. 3a is a cross-sectional view of the multifunctional plastic frame shown in FIG. 2 taken along a line A, FIG. 3b is a schematic structural view of a cover when being unfolded in the multifunctional plastic frame shown in FIG. 3a, and FIG. 3c is a schematic structural view of the cover after being turned over in the multifunctional plastic frame shown in FIG. 3a. In this embodiment, each of the covers 20 is formed with a catching hole 21, the frame body 10 is formed with catches 11 corresponding to the catching holes 21, and the catches 11 extend into the catching holes 21 respectively to be caught therein when the covers 20 are buckled to the frame body 10.

In this embodiment, the frame body 10 is formed with first grooves 12, and the catches 11 are disposed at bottom portions of the first grooves 12 respectively; and each of the covers 20 is formed with a second protruding groove 22 corresponding to the first groove 12, the second protruding groove 22 can extend into the first groove 12, and the catching hole 21 is formed at a top of the second protruding groove 22. After the covers 20 are turned over, opposite edges of the covers 20 with respect to the bending portions press against an LCD panel 30 with the second protruding grooves 22 extending into the first grooves 12 respectively, and then by pressing against the covers 20, the catches 11 are inserted through the catching holes 21 respectively to be caught therein. When it is necessary to maintain or replace the LCD panel, the catches 11 can be pulled out of the catching holes 21 simply by turning the catches 11, and then the covers 20 can be spread out again. Furthermore, the buckling portions of the frame body 10 and the covers 20 may also be fixed together through use of screws. For example, each of the covers 20 is formed with a through-hole for inserting a screw therethrough, the frame body 10 is formed with screw holes corresponding to the through-holes, and the screws are inserted through the through-holes and threaded into the screw holes respectively when the covers 20 are buckled to the frame body 10. By using simple catches 11 or screws to fix the covers 20 together with the frame body 10, this embodiment can not only secure the LCD panel against escape of the LCD panel but also allow for convenient assembling and detachment; and at the same, because the frame body 10 and the covers 20 are integrally formed through injection molding, the number of parts and consequently the cost are reduced.

In this embodiment, as the frame body 10 and the covers 20 are integrally formed through injection molding, the covers 20 and the frame body 10 are formed as an integral part, so the number of parts are reduced. The covers 20 are movably connected with the frame body 10 through the bending portions, and the covers 20 can be turned over along the bending portions for many times. The LCD panel is placed on a platform on an upper surface of the frame body 10 when the covers 20 are spread out; and when the covers 20 are turned over upwards, a surface of each of the covers 20 opposite to an inside edge of the frame body 10 presses against the LCD panel, and the covers 20 are buckled to the frame body 10 by means of components such as catches or screws to fix the LCD panel securely. Furthermore, in this embodiment, each of the covers 20 is of a rectangular block form and is formed with a buckling structure (e.g., a catching hole for inserting a catch therethrough or a through-hole for inserting a screw therethrough) for buckling the cover 20 to the frame body 10. The number of the covers 20 is at least two, and the covers 20 are arranged along two opposite outer edges of the frame body 10 to ensure that a uniform force is applied to press the LCD panel. For example, when the number of the covers 20 is four, the four covers 20 may be distributed at two opposite side edges of the frame body 10 in groups of two with the two groups being opposite to each other. Alternatively, the four covers 20 may also be distributed at four side edges of the frame body 10 respectively in such a way that each side edge is provided with one cover 20 at a middle part thereof. According to this embodiment, the covers 20 are additionally provided on the frame body 10 to replace the conventional front frame, and the frame body 10 and the covers 20 are integrally formed through injection molding, so the number of parts and consequently the cost are reduced. Furthermore, the backlight module can be assembled quickly in a convenient way by turning over the covers 20 and buckling the covers 20 to the frame body 10, which is favorable for improving the assembling efficiency of the backlight module.

Figure 4:
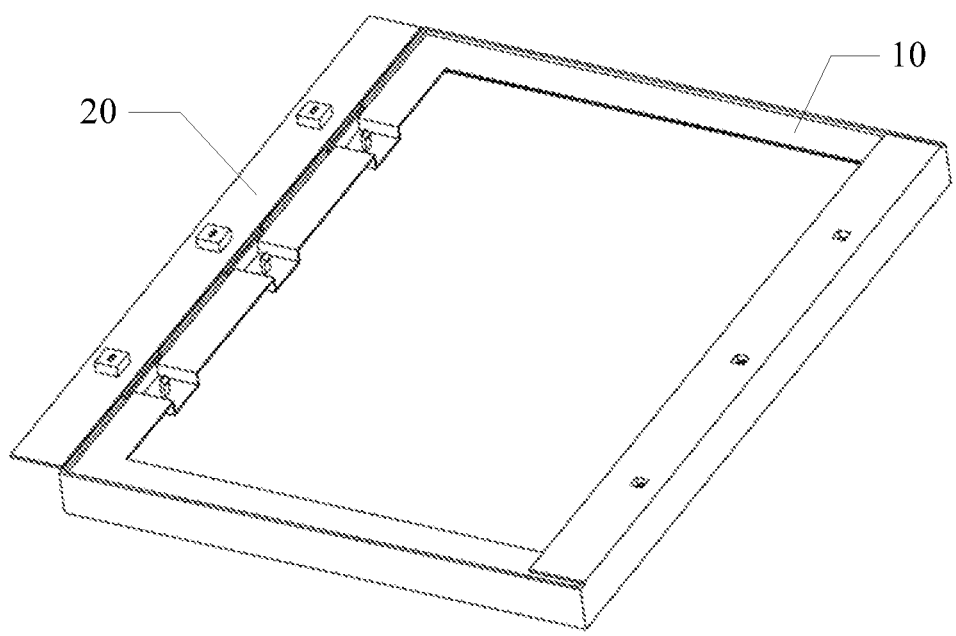
FIG. 4 is a schematic structural view of a multifunctional plastic frame according to another embodiment of the present disclosure.

As shown in FIG. 4, a schematic structural view of a multifunctional plastic frame according to another embodiment of the present disclosure is shown therein. In this embodiment, each of the covers 20 is of a strip form, and a plurality of buckling structures (e.g., catching holes for inserting catches therethrough or through-holes for inserting screws therethrough) are formed on the covers 20 corresponding to each of the outer edges of the frame body to buckle the covers 20 to the frame body 10. When the number of the covers 20 in the strip form is two, the covers 20 are arranged along two opposite side edges of the frame body 10 respectively; and when the number of the covers 20 in strip forms is four, the covers 20 are arranged along four side edges of the frame body 10 respectively to ensure that a uniform force is applied to press the LCD panel. As the plurality of buckling structures are assembled on one cover 20, this embodiment allows for quick and convenient assembly by turning over the covers 20 only once, which is favorable for improving the assembling efficiency.

Referring to FIG. 2, FIG. 3 and FIG. 4, an embodiment of the present disclosure further provides a backlight module, which comprises an LCD panel 30 and a multifunctional plastic frame. The multifunctional plastic frame comprises a frame body 10 for supporting the LCD panel 30 and covers 20 movably connected with outer edges of the frame body 10. The covers 20 are turned over along the outer edges of the frame body 10 to press against edges of the LCD panel 30 and to be buckled to the frame body 10. The multifunctional plastic frame of this embodiment may comprise all the technical solutions in the embodiments shown in FIG. 2 to FIG. 4 described above; and for the detailed structure thereof, reference may be made to the aforesaid embodiments and no further description will be made herein. As compared with the conventional backlight module, the backlight module of the present disclosure eliminates the need of the conventional front frame by adopting the solutions of the aforesaid multifunctional plastic frame and can be assembled more conveniently, which is favorable for improving the assembling efficiency of the backlight module and related LCD products. Furthermore, the number of parts and consequently the cost are reduced.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A multifunctional plastic frame, comprising a frame body for supporting a liquid crystal display (LCD) panel and covers movably connected with outer edges of the frame body, wherein the covers are turned over along the outer edges of the frame body to press against edges of the LCD panel and to be buckled to the frame body;

each of the covers is formed with a catching hole, the frame body is formed with catches corresponding to the catching holes, and the catches extend into the catching holes respectively to be caught therein when the covers are buckled to the frame body;

wherein the frame body is formed with first grooves, the catches are disposed at bottom portions of the first grooves respectively; and each of the covers is formed with a second protruding groove corresponding to the first groove, and the catching hole is formed at a top of the second protruding groove.

2. The multifunctional plastic frame of claim 1, wherein the number of the covers is at least two, and the covers are arranged along two opposite outer edges of the frame body.

3. The multifunctional plastic frame of claim 2, wherein the cover is of a rectangular block form, and each of the covers is formed with one catching hole.

4. The multifunctional plastic frame of claim 2, wherein each of the covers is of a strip form, and a plurality of catching holes are formed in the covers corresponding to each of the outer edges of the frame body.

5. A backlight module comprising an LCD panel, wherein the backlight module further comprises a multifunctional plastic frame, the multifunctional plastic frame comprises a frame body for supporting an LCD panel and covers movably connected with outer edges of the frame body, and the covers are turned over along the outer edges of the frame body to press against edges of the LCD panel and to be buckled to the frame body;

wherein each of the covers is formed with a catching hole, the frame body is formed with catches corresponding to the catching holes, and the catches extend into the catching holes respectively to be caught therein when the covers are buckled to the frame body; and the frame body is formed with first grooves, the catches are disposed at bottom portions of the first grooves respectively; and each of the covers is formed with a second protruding groove corresponding to the first groove, and the catching hole is formed at a top of the second protruding groove.

6. The backlight module of claim 5, wherein the number of the covers is at least two, and the covers are arranged along two opposite outer edges of the frame body.

7. The backlight module of claim 5, wherein the cover is of a rectangular block form, and each of the covers is formed with one catching hole.

8. The backlight module of claim 5, wherein each of the covers is of a strip form, and a plurality of catching holes are formed in the covers corresponding to each of the outer edges of the frame body.

9. The backlight module of claim 6, wherein each of the covers is formed with a through-hole for inserting a screw therethrough, the frame body is formed with screw holes corresponding to the through-holes, and the screws are inserted through the through-holes and threaded into the screw holes respectively when the covers are buckled to the frame body.

10. The backlight module of claim 9, wherein the cover is of a rectangular block form, and each of the covers is formed with one through-hole for inserting a screw therethrough.

11. The backlight module of claim 9, wherein each of the covers is of a strip form, and a plurality of through-holes for inserting screws therethrough are formed in the covers corresponding to each of the outer edges of the frame body.

* * * * *